(12) United States Patent
Harrington

(10) Patent No.: US 6,539,125 B1
(45) Date of Patent: Mar. 25, 2003

(54) MODIFIED MEDIAN FILTER THAT BETTER PRESERVES TEXTURES

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/217,645

(22) Filed: Dec. 21, 1998

(51) Int. Cl.[7] .............................. G06T 5/50; G06K 9/40; H04N 1/409
(52) U.S. Cl. ...................... 382/262; 382/275; 358/463
(58) Field of Search .............................. 382/262, 260, 382/261, 264, 266, 275; 358/463

(56) References Cited

U.S. PATENT DOCUMENTS

| | | | | |
|---|---|---|---|---|
| 4,800,511 A | * | 1/1989 | Tanaka ...................... | 382/262 |
| 4,827,533 A | * | 5/1989 | Tanaka ...................... | 382/262 |
| 5,068,909 A | * | 11/1991 | Rutherford et al. ......... | 382/302 |
| 5,506,699 A | * | 4/1996 | Wong ........................ | 358/456 |
| 6,108,455 A | * | 8/2000 | Mancuso ..................... | 382/261 |
| 6,208,764 B1 | * | 3/2001 | Archer et al. ............... | 382/262 |

FOREIGN PATENT DOCUMENTS

EP         1003332     *  5/2000        .......... H04N/5/217

OTHER PUBLICATIONS

"Performance Evaluation of Some Noise Reduction Methods", By Wen–Yen Wu et al., In Graphic Models and Image Processings, vol. 54, No. 2, Mar. 1992, pp. 134–146.*

* cited by examiner

*Primary Examiner*—Scott Rogers
(74) *Attorney, Agent, or Firm*—Fay, Sharpe, Fagan, Minnich & McKee, LLP

(57) ABSTRACT

The present invention provides a method for filtering noise out of an image. The image is constructed of pixels having varying intensity values. The method includes reading the intensity values for pixels within a neighborhood of an object pixel. Thereafter, a number of intensity values are selected from the read intensity values. The selected intensity values are those closest to the intensity value of the object pixel. A median value for the selected intensity values is then calculated. Finally, the median value is assigned as a new intensity value for the object pixel.

19 Claims, 3 Drawing Sheets

MODIFIED MEDIAN FILTER THAT BETTER PRESERVES TEXTURES

BACKGROUND OF THE INVENTION

The present invention relates to the art of image processing. It finds particular application in conjunction with median filters for image processing systems such as digital copiers and/or printers, and will be described with particular reference thereto. However, it is to be appreciated that the present invention is also amenable to other like applications.

In the field of image processing, a median filter is a known tool used for removing noise from an image. In operation, a typical median filter replaces each pixel intensity value with a new intensity value that is substantially equal the median intensity value of all the pixels in a surrounding neighborhood of the object pixel. Traditionally, median filters have been good at removing "salt-and-pepper" noise (i.e., erroneous values in isolated pixels) from an image. Moreover, median filters are advantageous in that they tend to preserve edges in an image. However, median filters also smooth fine textures. That is to say, for example, thin lines and other fine texture in the image are often removed by the traditional median filter. This degradation of image quality is generally unwanted in many applications where high definition image processing is desired.

The present invention contemplates a new and improved median filter and technique which overcomes the above-referenced problems and others.

SUMMARY OF THE INVENTION

In accordance with one aspect of the present invention, a method of filtering noise out of an image is provided. The image comprises pixels having varying intensity values. The method includes reading the intensity values for pixels within a neighborhood of an object pixel. A first number of intensity values are selected from the read intensity values. The selected intensity values are those that are closest to the intensity value of the object pixel. The median value for the selected intensity values is then calculated. Ultimately, the median value is assigned as a new intensity value for the object pixel.

In accordance with a more limited aspect of the present invention, prior to selecting the first number of intensity values, the read intensity values are sorted from lowest to highest.

In accordance with a more limited aspect of the present invention, the first number is such that less than all the read intensity values are selected.

In accordance with a more limited aspect of the present invention, the neighborhood is centered on the object pixel and has dimensions of N pixels by N pixels where N is a whole number.

In accordance with a more limited aspect of the present invention, the first number is less than or equal to 2N−1.

In accordance with a more limited aspect of the present invention, the first number is selectively adjustable.

In accordance with a more limited aspect of the present invention, the first number is automatically adjusted based on one or more detected characteristics of the image.

In accordance with a more limited aspect of the present invention, the one or more detected characteristics are selected from a group consisting of variance in intensity values of pixels and amounts of noise in an area of the image being filtered.

In accordance with a more limited aspect of the present invention, the steps of the method are repeated for each pixel of the image such that on each repetition a consecutive pixel of the image is designated as the object pixel.

In accordance with another aspect of the present invention, an image-processing system for filtering noise out of images while maintaining texture is provided. It includes an image-input terminal that reads an image as a plurality of pixels with varying intensity values. It also includes an image-processing unit which includes a filter. The filter: (i) samples intensity values of pixels in a neighborhood including an object pixel; (ii) selects a first number of intensity values from the sampled intensity values such that those selected are closest to an intensity value of the object pixel; (iii) calculates a median value from the selected intensity values; and (iv) assigns the median value as a new intensity value for the object pixel. Finally, an image-output terminal renders the image in accordance with the new pixel intensity values.

In accordance with a more limited aspect of the present invention, the filter is scanned across the image such that each consecutive pixel of the image is successively designated the object pixel.

In accordance with a more limited aspect of the present invention, the image-input terminal includes one or more image readers selected from a group consisting of a scanner, a stored image reader, and a computer image generator.

In accordance with a more limited aspect of the present invention, the image-output terminal includes one or more image rendering engines selected from a group consisting of an image storage device, a digital printer, a laser printer, and a video display monitor.

One advantage of the present invention is it ability to suppress "salt-and-pepper" noise in image processing systems.

Another advantage of the present invention is that while suppressing the noise image texture is preserved.

Yet another advantage of the present invention is that it may be selectively tuned prior to image processing and/or on the fly in response to certain detected image characteristics.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
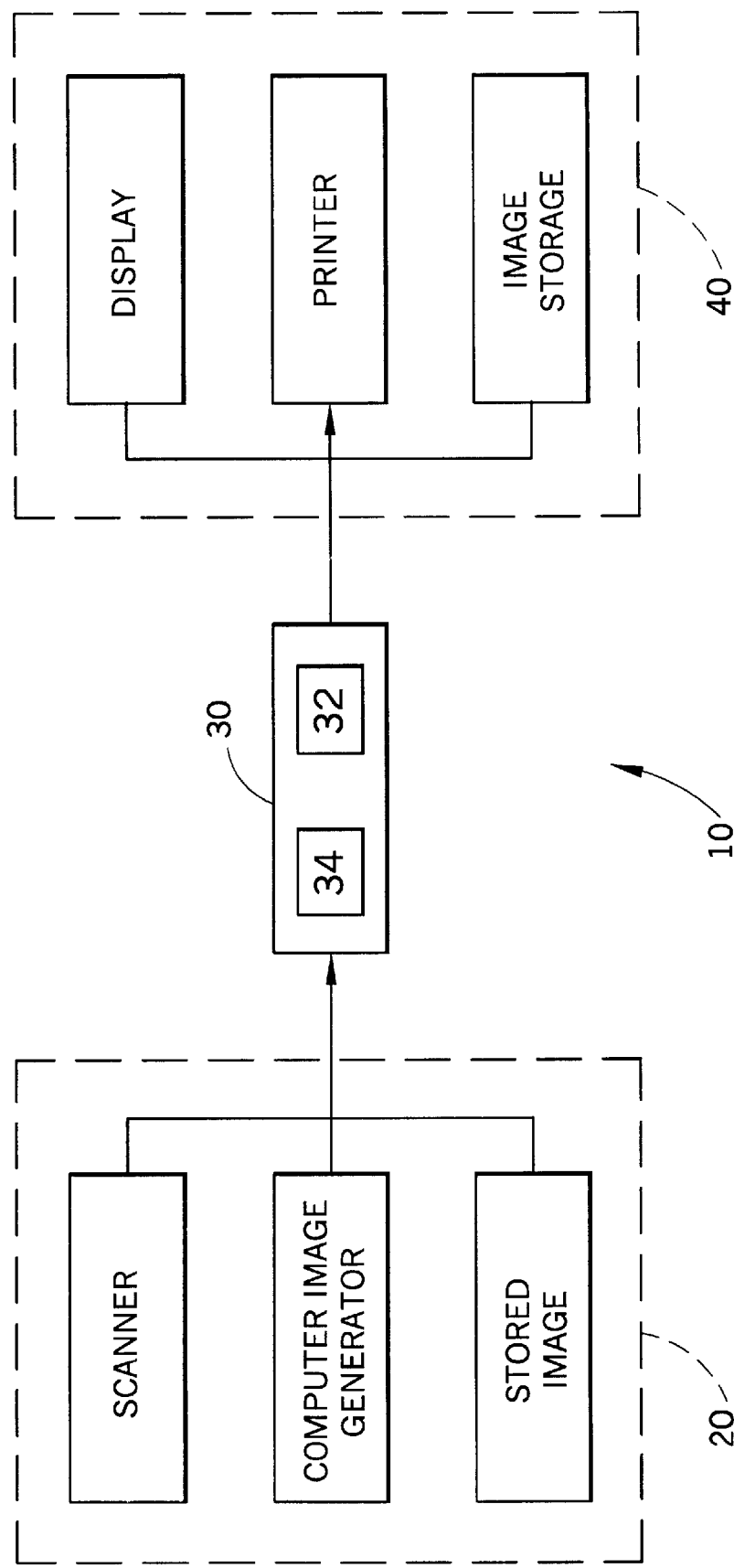
FIG. 1 is a diagrammatic illustration of an image-processing system in accordance with aspects of the present invention.

With reference to FIG. 1, an image-processing system 10 employs an image-input terminal 20 to read, retrieve, or otherwise receive an input image consisting of a plurality of pixels having varying intensity values. The image-input terminal 20 optionally includes one or more suitable image-input devices such as an electronically or otherwise stored image reader, a computer image generator, a scanner, or the like.

An image-processing unit 30 includes a pixel level median filter 32, which is scanned across the image entered at the image-input terminal 20. The filter 32 reduces "salt-and-pepper" noise while preserving the finer textures within the image. Optionally, the image-processing unit 30 also includes detectors 34 which detect various characteristics of the input image such as the variance in pixel intensity values within different regions of the image, the noise levels in different regions of the image, and the like. Based on these measured characteristics, the image-processing unit 30, in a preferred embodiment, automatically tunes the filter 32 for optimal performance. The tuning of the filter 32 is optionally set prior the image being processed or alternately tuned on the fly as the image is being processed to adjust for changes in image characteristics from region to region. Optionally, the filter 32 and/or the detectors 34 are implemented via hardware, software, or combinations of hardware and software configurations.

Figure 2:
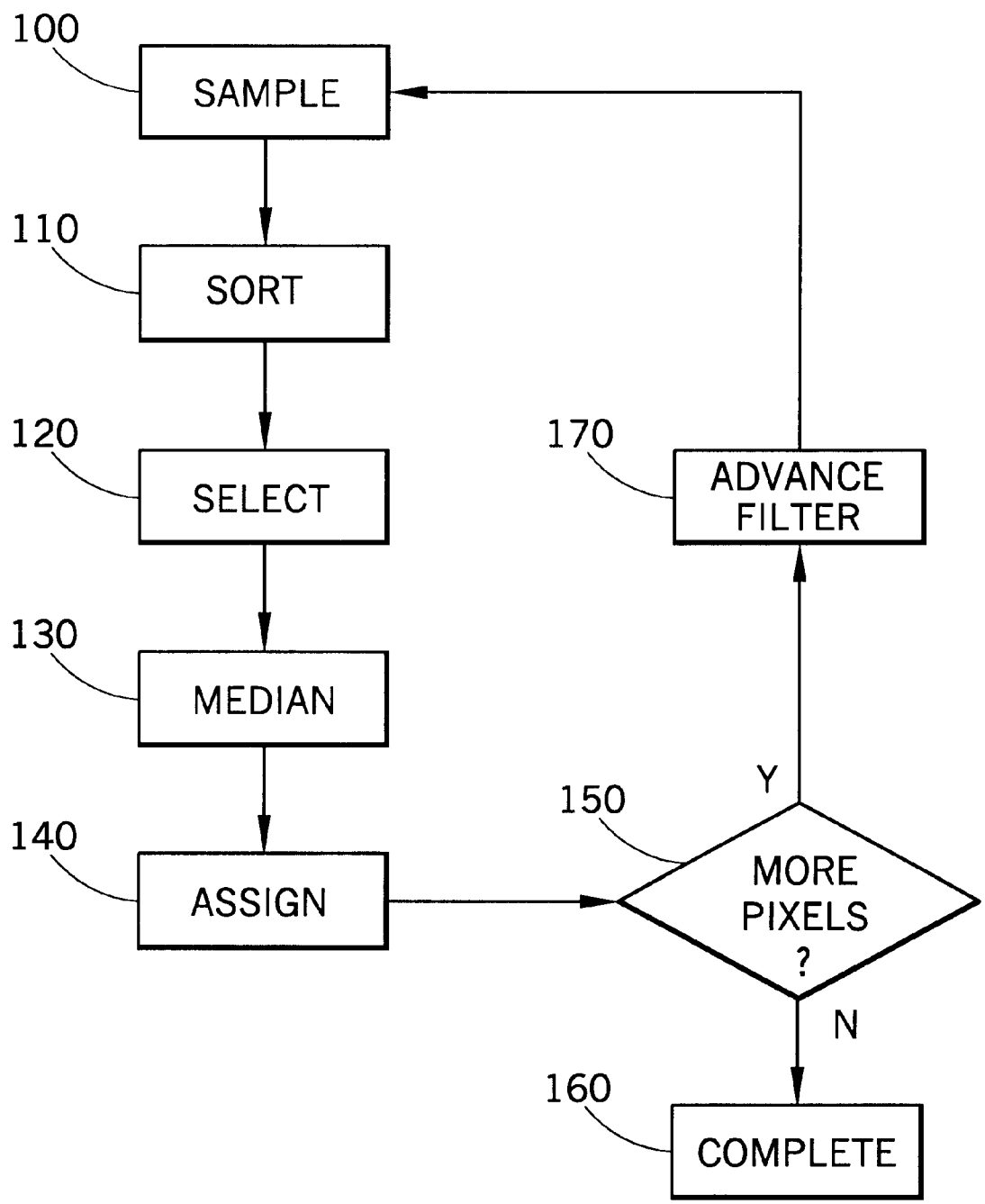
FIG. 2 is a flow chart illustrating the operation of a median filter in accordance with aspects of the present invention; and, FIGS. 3A and 3B are diagrammatic illustrations showing the texture preserving operation of an exemplary median filter in accordance with aspects of the present invention.

With reference to FIG. 2, the operation of a preferred embodiment of the filter 32 is illustrated by a flow chart. At step 100, the filter 32 samples intensity values of pixels within a neighborhood defined by the dimensions of the filter 32. The neighborhood, defined by the dimensions of the filter 32, includes an object pixel. In a preferred embodiment, the neighborhood is centered on the object pixel. As the filter 32 scans across the image, successive pixels are designated as the object pixel. Additionally, in a preferred embodiment, the dimensions of the neighborhood are N pixels by N pixels, where N is a whole number (e.g., 3, 4, or 5). Where the object pixel is perfectly centered in the neighborhood, N is an odd number. Ultimately, the dimensions of the neighborhood are defined by the dimensions of the filter 32 and are optionally adjustable as the filter 32 is tuned for a desired application or a particular image.

In a preferred embodiment, at step 110, the sampled intensity values are sorted according to their relative luminescence (i.e., from highest to lowest or vice versa). From the sorted intensity values a number are selected, at step 120, which are closest to the intensity value of the object pixel. Alternately, rather than sorting all the sampled intensity values, a buffer is maintained which holds a limited number of intensity values which are closest in value to the intensity value of the object pixel such that as closer intensity values are sampled and loaded into the buffer the farthest values from the object intensity value are discarded. In this manner, the number of selected intensity values which are closest to that of the object pixel are those maintained in the buffer. In any event, the number selected is less than the total number of pixels within the neighborhood. Alternately, in a preferred embodiment, where the dimensions of the filter 32 are N pixels by N pixels, the number selected in less than or equal to 2N−1. This threshold level ensures that textures as fine as one pixel in width are preserved. In alternate embodiments, the number of intensity values selected is either preset, selectively adjustable for desired results, and/or automatically adjustable based on measurements from the detector 34. In the case where the buffer is employed, the size of the buffer determines the number of intensity values selected.

After the selection step 120, the median value of the selected intensity values is calculated at step 130, and at step 140, this median value is assigned as the new or output intensity value for the object pixel. Next at inquiry 150, it is determine whether or not there are other pixels which have not yet been filtered. If there are no further pixels for filtering, the process branches to step 160 were the filtering is complete and the filtered image is transferred on. On the other hand, if additional pixels remain for filtering, the process branches to step 170 where the filter 32 is advanced to the next object pixel and then on to step 100 where the process is repeated for the new object pixel.

Ultimately, an image-output terminal 40 receives the image from the image-processing unit 30 and renders the image in accordance with the new pixel intensities assigned by the filter 32 in the image-processing unit 30. Optionally, the image-output terminal 40 includes one or more appropriate rendering engines such as an image storage device, a digital printer, a laser printer, a video display monitor, or the like.

Figures 3A, 3B:
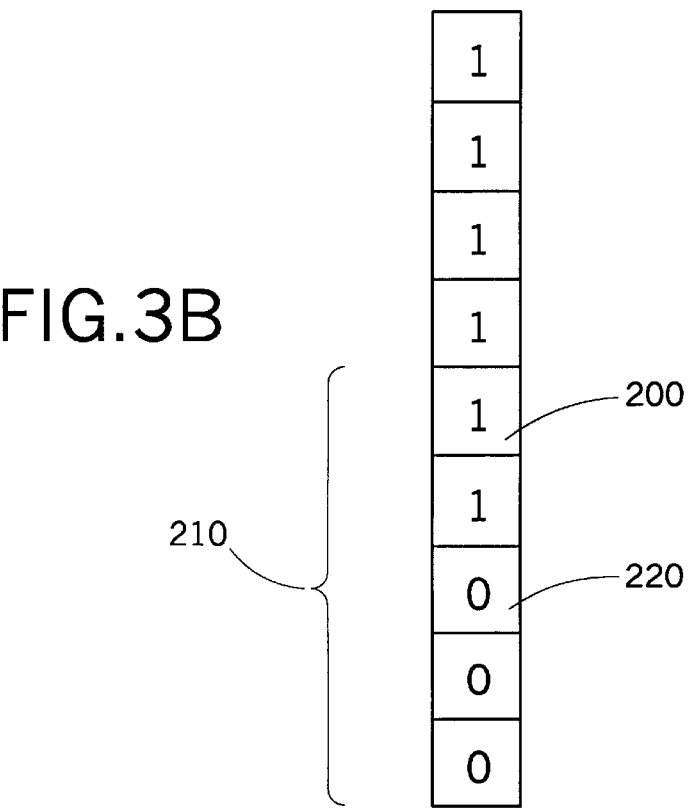

With reference to FIGS. 3A and 3B, the texture preserving nature of the filter 32 is illustrated by way of comparison with a traditional median filter operating in identical exemplary situations. Consider a 3×3 filter 32 scanning across an image having a background of black pixels (black being represented by an intensity value of 1). The image includes a fine texture existing as a vertical line of white pixels (white being represented by an intensity value of 0). When the center pixel of the filter 32 is the object pixel and it is on the vertical line of white pixels, the set of sampled intensity values includes six 1 values and three 0 values. When sorted, the intensity values are arranged as shown in FIG. 3B. A traditional median filter calculates and selects intensity value 200 as the median. By assigning this median value, namely 1, as the new value for the object pixel at each vertical position along the line, the value of the otherwise white vertical line is changed to black and effectively removed. On the other hand, consider a filter in accordance with a preferred embodiment of the present invention, wherein the selected number in step 120 is equal to 2N−1. 2N−1=2(3)−1=5, therefore at step 120 the five intensity values closest to the intensity value of the object pixel (i.e., 0) are chosen. As illustrate, this means that the bottom five values 210 are selected, and the median thereof is calculate as intensity value 220, namely 0. Hence, for each vertical position of the object along the white line, the intensity value remains 0 and the white vertical line is preserved.

The invention has been described with reference to the preferred embodiments. Obviously, modifications and alterations will occur to others upon reading and understanding the proceeding detailed description. It is intended that the invention be construed as including all such modifications and alterations insofar as they come within the scope of the appended claims or the equivalents thereof.

Having thus described the preferred embodiments, the invention is now claimed to be:

1. A method for filtering noise out of an image, said image comprising pixels having varying intensity values, the method comprising:

(a) reading the intensity values for pixels within a neighborhood of an object pixel, said neighborhood having a size;

(b) selecting a first number of intensity values from the read intensity values, said selected intensity values being those closest to the intensity value of the object pixel;

(c) calculating a median value for the selected intensity values;

(d) assigning the median value as a new intensity value for the object pixel; and, (e) tuning the filtering, said tuning including setting at least one of: (i) the neighborhood size; and, (ii) the first number, based upon a measured characteristic of said image.

2. The method according to claim 1, wherein the neighborhood is centered on the object pixel and has dimensions of N pixels by N pixels where N is a non-unitary whole number, and the first number is set to be less than or equal to 2N−1.

3. The method according to claim 1, wherein steps (a) through (e) are repeated for each pixel of the image such that on each repetition a consecutive pixel of the image is designated as the object pixel.

4. A method for filtering noise out of an image, said image comprising pixels having varying intensity values, the method comprising:

(a) reading the intensity values for pixels within a neighborhood of an object pixel;

(b) selecting a first number of intensity values from the read intensity values, said selected intensity values being those closest to the intensity value of the object pixel, wherein the first number is automatically adjusted based on one or more detected characteristics of the image;

(c) calculating a median value for the selected intensity values; and, (d) assigning the median value as a new intensity value for the object pixel.

5. The method according to claim 4, wherein prior to step (b) the read intensity values are sorted from lowest to highest.

6. The method according to claim 4, wherein the first number is such that less than all the read intensity values are selected.

7. The method according to claim 4, wherein the neighborhood is centered on the object pixel and has dimensions of N pixels by N pixels where N is a whole number.

8. The method according to claim 4, wherein the one or more detected characteristics are selected from a group consisting of variance in intensity values of pixels and amounts of noise in an area of the image being filtered.

9. An image-processing system for filtering noise out of images while maintaining texture comprising:

an image-input terminal that reads an image as a plurality of pixels with varying intensity values;

a filter that: (i) samples intensity values of pixels in a neighborhood including an object pixel, said neighborhood having a size; (ii) selects a first number of intensity values from the sampled intensity values such that those selected are closest to an intensity value of the object pixel; (iii) calculates a median value from the selected intensity values; and, (iv) assigns the median value as a new intensity value for the object pixel;

an image-output terminal that renders the image in accordance with the new pixel intensity values;

detectors which measure one or more characteristics of the image; and, tuning means for tuning the filter, said tuning means setting at least one of: (i) the neighborhood size; and, (ii) the first number, based upon the one or more measured characteristics of said image.

10. The image-processing system according to claim 9, wherein the neighborhood is centered on the object pixel and has dimensions of N pixels by N pixels where N is a non-unitary whole number, and the first number is set to be less than or equal to 2N−1.

11. The image-processing system according to claim 9, wherein the filter is scanned across the image such that each consecutive pixel of the image is successively designated the object pixel, the filter being dynamically tuned by the tuning means as the filter is scanned across the image.

12. An image-processing system for filtering noise out of images while maintaining texture, said image-processing system comprising:

an image-input terminal that reads an image as a plurality of pixels with varying intensity values;

a filter that: (i) samples intensity values of pixels in a neighborhood including an object pixel; (ii) selects a first number of intensity values from the sampled intensity values such that those selected are closest to an intensity value of the object pixel; (iii) calculates a median value from the selected intensity values; and, (iv) assigns the median value as a new intensity value for the object pixel, and, detectors which detect one or more characteristics of the image such that based thereon the first number is automatically adjusted; and, an image-output terminal that renders the image in accordance with the new pixel intensity values.

13. The image-processing system according to claim 12, wherein the filter is scanned across the image such that each consecutive pixel of the image is successively designated the object pixel.

14. The image-processing system according to claim 13, wherein the neighborhood is centered on the object pixel and has dimensions of N pixels by N pixels where N is a whole number.

15. The image-processing system according to claim 14, wherein the first number is less than N×N.

16. The image-processing system according to claim 12, wherein the one or more characteristics detected by the detectors are selected from a group consisting of variances in intensity values of pixels and noise present in an area of the image.

17. The image-processing system according to claim 12, wherein prior to selecting the first number of intensity values, the filter sorts the sampled intensity values from lowest to highest.

18. The image-processing system according to claim 12, wherein the image-input terminal includes one or more image readers selected from a group consisting of a scanner, a stored image reader, and a computer image generator.

19. The image-processing system according to claim 12, wherein the image-output terminal includes one or more image rendering engines selected from a group consisting of an image storage device, a digital printer, a laser printer, and a video display monitor.

* * * * *